United States Patent Office 3,492,425
Patented Jan. 27, 1970

3,492,425
REVERBERATION SYSTEM ADAPTED TO GENERATE VIBRATO, ECHO AND OTHER EFFECTS
Chauncey Richard Evans, Costa Mesa, Calif., assignor to Columbia Broadcasting System, Inc., New York, N.Y., a corporation of New York
Filed Jan. 18, 1968, Ser. No. 704,209
Int. Cl. H04m 1/21
U.S. Cl. 179—1
28 Claims

ABSTRACT OF THE DISCLOSURE

A reverberation system incorporating a plurality of artificial reverberators, and further incorporating gating means for effecting alternate loading and unloading of the reverberators. The rate of gating is varied in order to generate echo effects when gating is effected slowly, and vibrato effects when gating is effected rapidly. Other circuit elements are provided to generate a wide variety of sound effects, stereo and otherwise, and also to generate psychedelic lighting effects.

BACKGROUND OF THE INVENTION

Field of the invention

This invention relates to the field of reverberation systems such as are employed in conjunction with amplifiers for electrical musical instruments. The invention further relates to the field of means for creating lighting effects in conjunction with the generated sounds.

Description of the prior art

It is conventional, in the field of electrical musical instruments and amplifiers therefor, to provide artificial reverberators intended to simulate the sounds generated in large halls, etc. Such reverberators are storage devices. They frequently take the form of delay-introducing sound-transmission springs, such as coil springs, the input and output ends of which are associated with suitable transducers. It is also known to employ several of such reverberators simultaneously in order to simulate stereophonic effects. In this connection, reference is made to the U.S. Patent No. 3,048,072, for an Apparatus for Producing Pseudo-Stereophonic Effects. However, insofar as is known to applicant, the prior art does not include sound systems incorporating reverberators in combination with gating means adapted to generate not only reverberation effects but also vibrato, echo, lighting and other effects. In addition, the gating means provide other beneficial actions including minimization of the tendency toward destructive feedback.

SUMMARY OF THE INVENTION

In accordance with the present invention, an artificial reverberator or equivalent storage device is incorporated in the circuit from the audio signal source to the loudspeaker means, and gating or switching means are provided to effect alternate loading and unloading of the reverberator. The invention further provides at least one other artificial reverberator and associated gating means, and means to correlate the gating means in such manner that one reverberator is loaded or charged while the other reverberator is unloaded or discharged. Means are provided to control the rate of operation of the gating means in such manner that gating may be effected slowly, thereby generating echo effects, or more rapidly to thus generate vibrato effects.

Additional circuit means such as octave jumpers, fuzz tone devices, tone control devices, vibrato or tremolo devices, etc., may be provided in conjunction with the reverberations to thereby generate a wide variety of novel sounds. Lighting means are controlled by the gating or switching means in order to create psychedelic lighting, thereby eliminating problems (such as that of threshold level) which plague prior-art apparatus for this purpose.

DESCRIPTION OF THE PREFERRED EMBODIMENTS

The present invention relates solely to audio systems, wherein an audio signal from an audio signal source is transmitted to suitable loudspeaker means. Frequently, but not necessarily, the audio signal source is an electromagnetic, piezoelectric, or other transducer, associated with a musical instrument such as a guitar, piano, trumpet, etc. The transducer means is indicated at 10.

Figure 1:
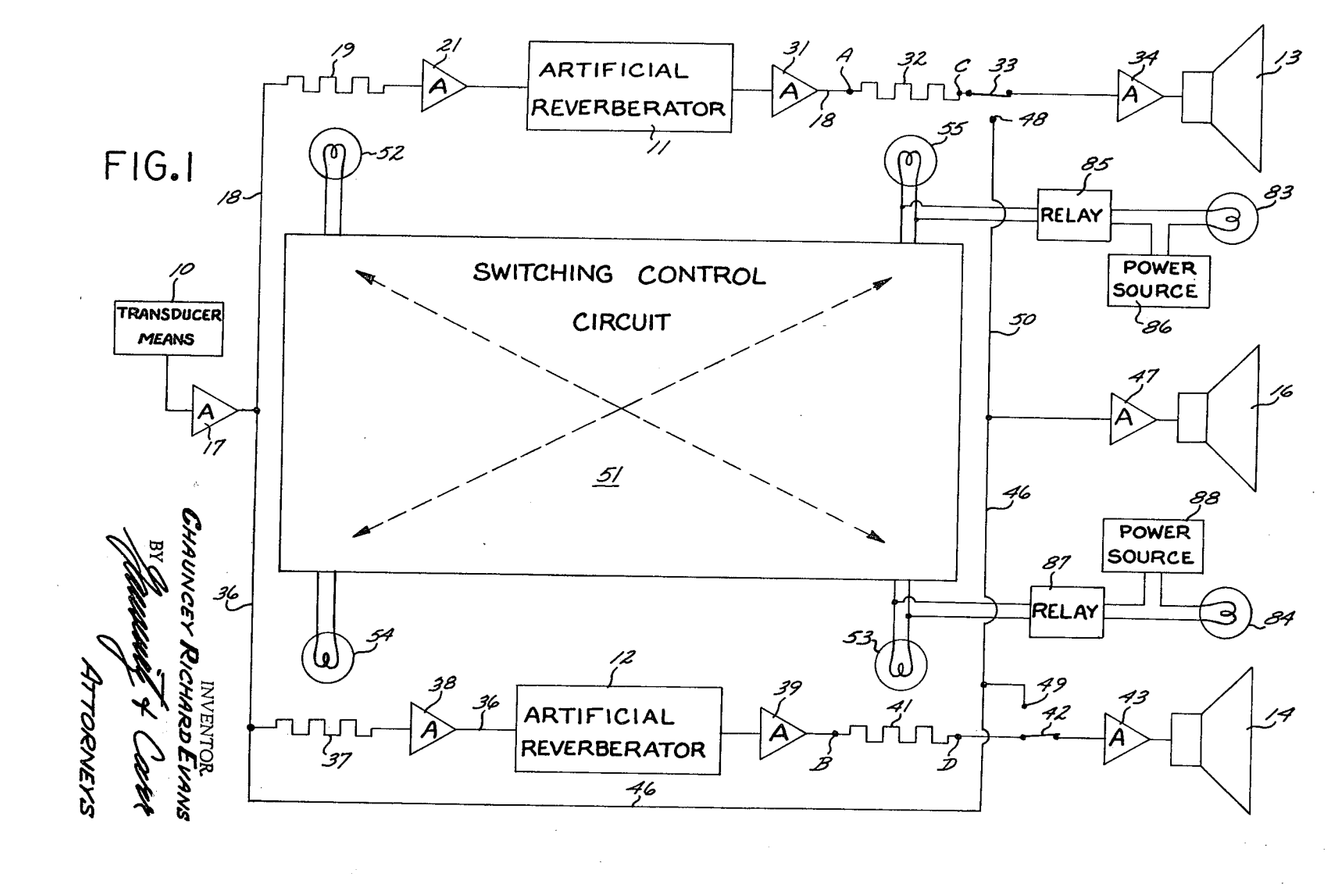
FIGURE 1 is a diagram schematically representing one form of system incorporating the present invention.

Referring to FIGURE 1, the gated reverberation system is schematically represented as comprising the transducer means 10 connected through artificial reverberators 11 and 12 with loudspeakers 13 and 14, respectively. Switching control means are provided to effect loading of reverberator 11 while reverberator 12 is being unloaded, and loading of reverberator 12 while reverberator 11 is being unloaded. Speaker 13 generates a sound wave representing the signal emanating from reverberator 11 while it is unloading, whereas speaker 14 generates a sound wave representing the signal emanating from reverberator 12 during its unloading phase. Preferably, speakers 13 and 14 are located substantial distances from each other in a room in order to produce stereophonic effects.

A third speaker, numbered 16, is provided in the room at a location between speakers 13 and 14. Such third speaker is directly supplied with signal from the transducer 10 at all times and not intermittently. It is pointed out, however, that reverberator or other circuit means may be incorporated in the circuit between the transducer 10 and speaker 16. Also, for purposes of economy, one or both of the speakers 13 and 14 and their associated power amplifiers may be omitted, the reverberators 11 and 12 then unloading into a circuit connected to the single speaker 16 (or into such speaker in combination with one other speaker) as will be described subsequently.

Figure 3:
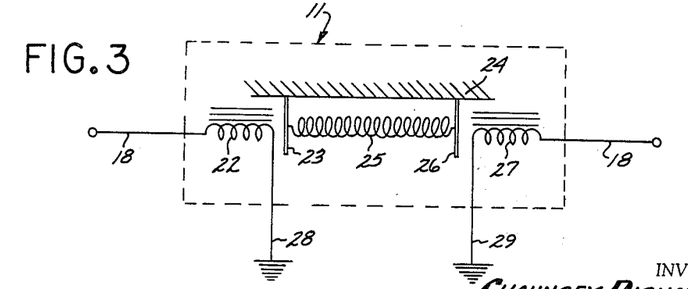
FIGURE 3 is a schematic representation of one form of artificial reverberator which is incorporated at several points in the system of FIGURE 1.

Stated more definitely the transducer means 10 is connected through a suitable preamplifier 17 to the upper lead or channel 18 of the reverberation system. Signal from the transducer 10 flows upwardly through lead 18 to a light-dependent resistor 19, and thence through an amplifier 21 to the artificial reverberator 11. The reverberator 11 may be of the conventional spring type such as is represented in FIGURE 3 wherein lead 18 is shown as connected to an input coil 22 magnetically associated with a magnetizable armature 23, the latter being flexibly related to a suitable support 24. Vibration of armature 23 in response to the signal passing through coil 22 causes transmission of waves down an elongated spring 25, illustrated as a coil spring, which is connected to a second magnetizable armature 26 mounted on support 24. Armature 26 is, in turn, magnetically associated with the output coil 27 and operates to generate a signal therein for transmission to the output side of the reverberator 11. Conventional grounding portions of the circuit are indicated at 28 and 29 in FIGURE 3 but are, for purposes of simplicity of illustration, omitted from FIGURES 1 and 6.

From reverberator 11, the signal in upper lead or channel 18 is fed into an additional amplifier 31 and then passed through a second light-dependent resistor 32. When the illustrated single-pole double-throw switch 33 is in the indicated position, the signal then passes through an output or power amplifier 34 to the loudspeaker 13.

The lower channel of the reverberation system of FIGURE 1 preferably corresponds, except as will be noted, to the above-described upper channel thereof. Thus, the transducer means 10 is also connected to a lower lead or channel 36 so that signal is supplied to a light-dependent resistor 37, an amplifier 38, and the second reverberator 12. The output from reverberator 12 is fed through an amplifier 39, a light-dependent resistor 41, and a switch 42 to the power amplifier 43 for loudspeaker 14.

The second reverberator 12 is preferably constructed the same as the first reverberator 11, for example as described relative to FIGURE 3. It is pointed out, however, that the characteristics of the spring portions 25 of the two reverberators 11 and 12 are inherently different, the result being that the signals emanating from the two reverberators 11 and 12 will necessarily be different despite the fact that the two reverberators 11 and 12 may be two units taken off the same assembly line.

The transducer means 10 is also connected through lead 36 and another lead 46 to the power amplifier 47 for the third speaker 16. Thus, when the switches 33 and 42 are in their indicated positions, the transducer 10 is connected through reverberator 11 to speaker 13 (subject to the switching control or gating which forms an essential feature of the present invention), through reverberator 12 to speaker 14 (also subject to such switching control), and continuously through lead 46 to the third speaker 16.

As before indicated, the speakers 13 and 14 and their associated power amplifiers may be omitted, this being achieved by shifting the movable elements of switches 33 and 42 away from their illustrated positions and into engagement with contacts 48 and 49 which are connected, respectively, through leads 50 and 46 to the amplifier 47 for speaker 16.

It is pointed out that there may be more than two reverberators 11 and 12 and associated circuitry and speakers. Thus, for example, it is within the scope of the invention to provide a substantial number of speakers located at spaced points about the periphery of a large room, each speaker having associated therewith an artificial reverberator and the below-described switching control circuitry. The gating control and other elements are then so related that the listener hears the various speakers at different times.

Figure 2:
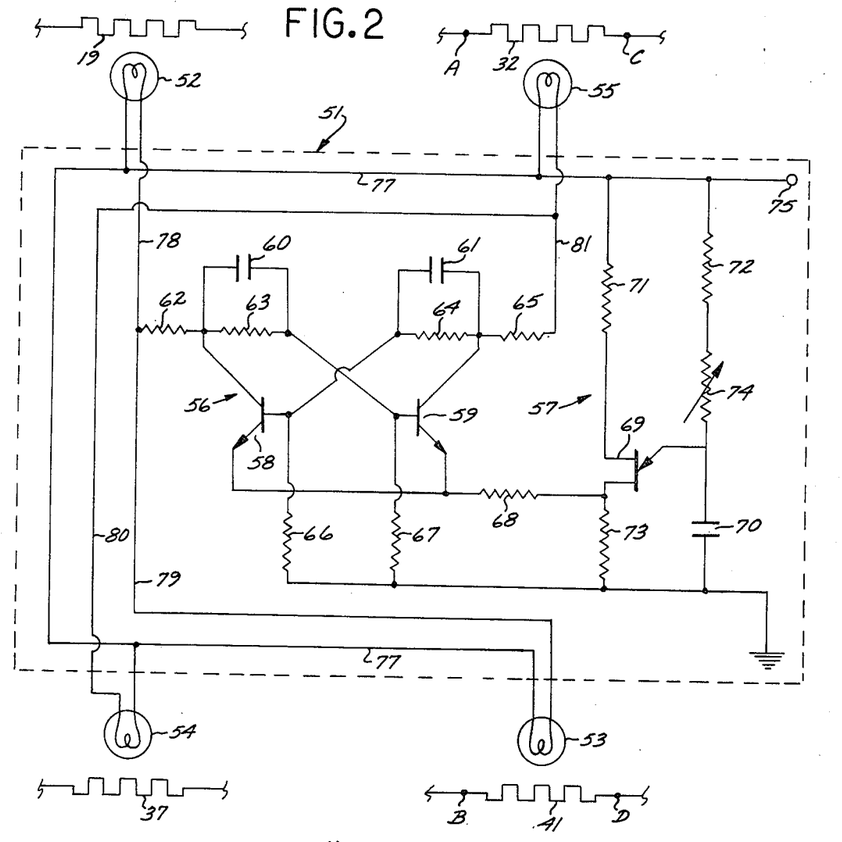
FIGURE 2 is a wiring diagram illustrating one form of switching control circuit for the system of FIGURE 1.

Proceeding next to a description of the switching or gating means for effecting the above-indicated loading and unloading of reverberators 11 and 12, a switching control circuit is represented in block form at 51 in FIGURE 1, and in detail in FIGURE 2. Circuit 51 effects supply of power from a suitable source to four lamps 52–55 which are optically coupled, respectively, with the light-dependent resistors 19, 41, 37 and 32. The operation of control circuit 51 is such that lamps 52 and 53 are energized simultaneously, in alteration with the simultaneous energization of lamps 54 and 55. Such simultaneous energization of lamps 52 and 53, followed by simultaneous energization of lamps 54 and 55, is represented by the crossed arrows in FIGURE 1.

Referring to FIGURE 2, the switching control circuit 51 is illustrated as comprising a bistable multivibrator 56 driven by a unijunction transistor relaxation oscillator 57. Such circuits are of conventional construction, and may be designed in accordance with the principles set forth in the General Electric Transistor Manual, Seventh Edition, at pages 313 and 338. The illustrated multivibrator 56 incorporates NPN transistors 58 and 59, capacitors 60 and 61, and resistors 62–68. Oscillator 57 comprises a unijunction transistor 69, capacitor 70 and fixed resistors 71–73. A variable resistor 74 is interposed between one terminal of fixed resistor 72 and the emitter of transistor 69 in order to control the charging rate of capacitor 70 and thus the frequency of oscillation. The remaining terminal of fixed resistor 72 is connected to the B+ supply terminal 75.

All of the lamps 52–55 have one terminal connected to a lead 77 supplied by B+ terminal 75. The remaining terminals of lamps 52 and 53 are connected through leads 78 and 79 to the resistor 62 associated with transistor 58. The remaining terminals of lamps 54 and 55 are connected through leads 80 and 81 to the resistor 65 associated with the other transistor 59.

From the above it will be understood that lamps 52 and 53 are connected in parallel with each other and will be illuminated when multivibrator 56 is in one of its states, whereas the remaining lamps 54 and 55 are connected in parallel with each other and will be illuminated when multivibrator 56 is in its other state. The frequency of the change in states of multivibrator 56 is, as noted above, controlled by variable resistor 74 which determines the rate of oscillation of oscillator 57.

Since the resistance of each light-dependent resistor is maximum in darkness and minimum in light, the upper reverberator 11 will load when lamp 52 is energized, this being simultaneous with unloading of the lower reverberator 12 in response to energization of lamp 53. Correspondingly, the upper reverberator 11 will unload when lamp 55 is illuminated, which coincides with loading of the lower reverberator 12 due to energization of lamp 54 simultaneously with energization of lamp 55.

The remainder of the circuitry illustrated in FIGURE 1 comprises lamps 83 and 84 which create "psychedelic lighting," the lamps being preferably located in the vicinity of the respective speakers 13 and 14 although various other locations may be selected. A relay 85 is connected in parallel with lamp 55, the relationship being such that when lamp 55 is energized the relay 85 will be in closed condition and will therefore effect supply of power from a suitable power source 86 to the psychedelic lamp 83. It follows that lamps 55 and 83 are simultaneously energized. Correspondingly, a second relay 87 connected in parallel with lamp 53 causes energization of psychedelic lamp 84 (simultaneously with energization of lamp 53) by closing a circuit from a suitable power source 88.

Because of the precise switching effected by the multivibrator 56 and associated lamps 52–55, there are no threshold problems relative to the illumination of lamps 83 and 84 simultaneously with transmission of signals to the loudspeakers 13 and 14, respectively, associated with such lamps.

OPERATION, EMBODIMENT OF FIGURES 1–3

Figure 4:
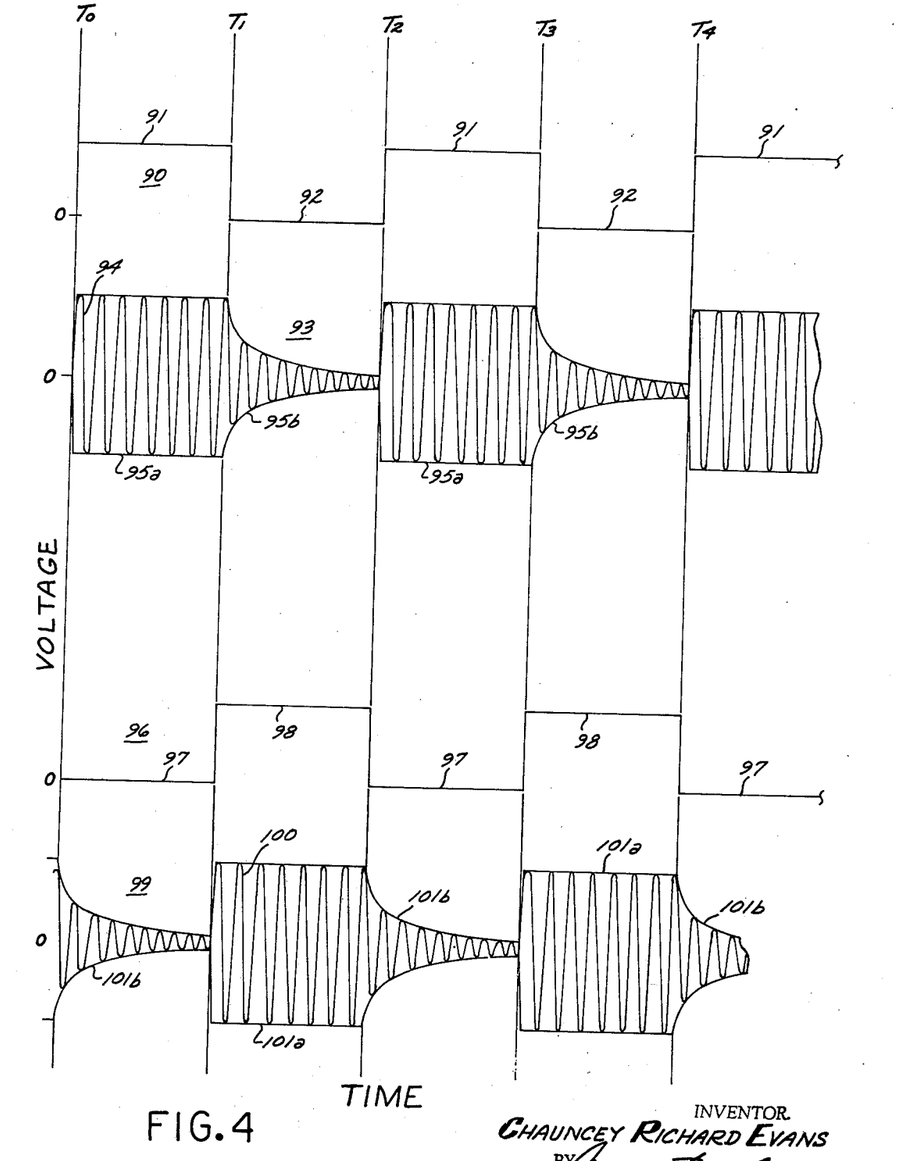
FIGURE 4 is a schematic representation illustrating the loading and unloading of the artificial reverberators.
Figure 5:
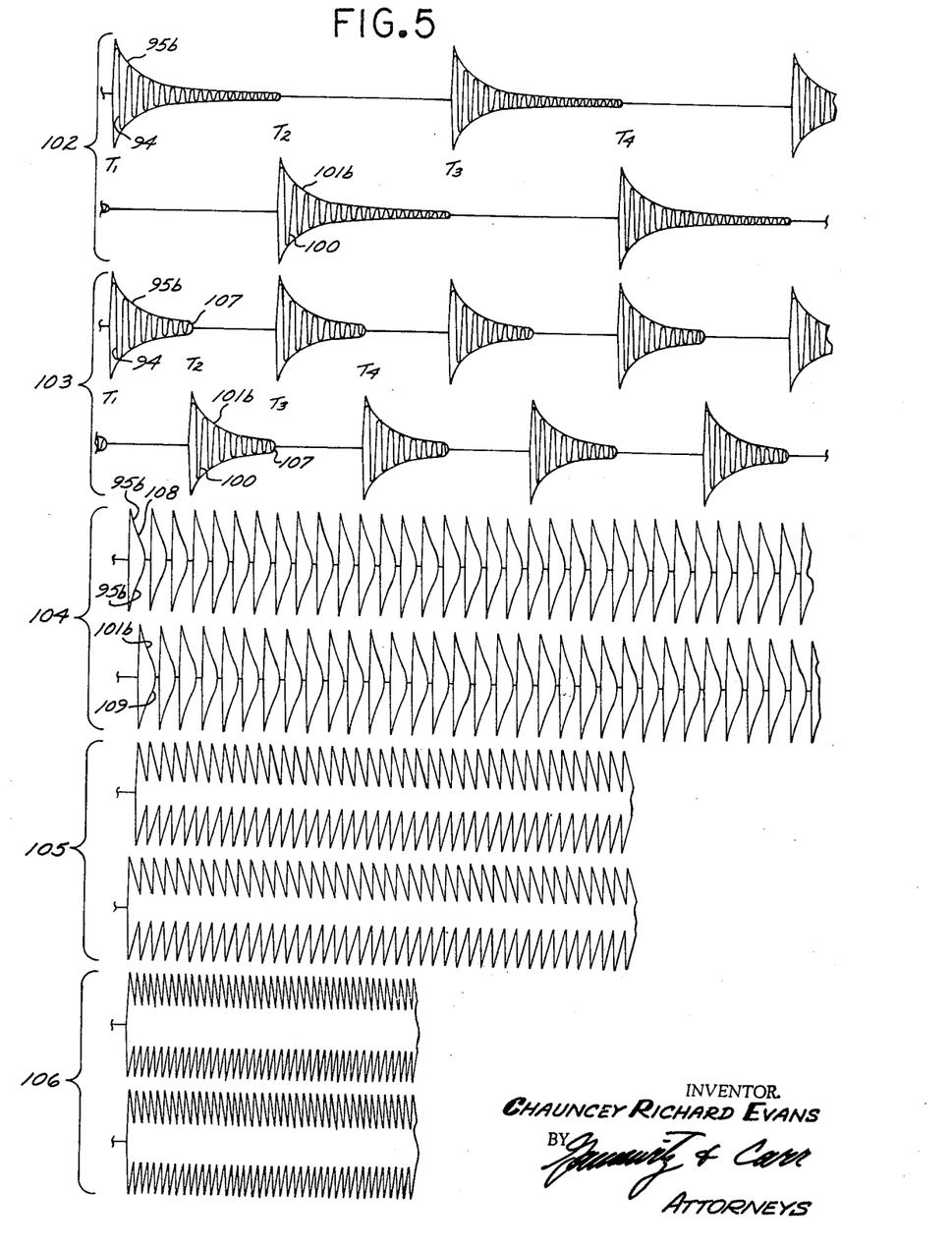
FIGURE 5 is a schematic representation of the output at various switching or gating frequencies, the upper portions of the drawing illustrating slow gating resulting in echo effects, and the lower portions illustrating rapid gating resulting in vibrato effects.

The method of operation of the embodiment of FIGURES 1–3 will next be described, making reference to the illustrations of FIGURES 4 and 5 which constitute schematic representations of various generated sound waves and electrical signals in the audio range. In the showings of FIGURES 4 and 5, and audio signals are illustrated as being in the nature of sine waves, but it is to be understood that the signals are normally highly complex waves such as are generated by guitars or other electrical musical instruments.

Referring first to FIGURE 4, the upper curve 90 represents the voltage applied to the lamp 52, which is the lamp controlling loading of reverberator 11. Such curve has portions 91, representing periods when full voltage is applied to the lamp, and 92 representing periods when no voltage is applied thereto. The upper curve 90 is a plot of voltage against time, the time being indicated at $T_0$, $T_1$, $T_2$, $T_3$ and $T_4$. Each time interval $T_0$-$T_1$, $T_1$-$T_2$, etc., has a duration determined by the setting of the variable resistor 74 in the unijunction oscillator 57 (FIGURE 2).

The next curve in FIGURE 4, numbered 93, is a plot against time of the voltage present at point "A" (FIGURES 1 and 2) on the input side of light-dependent resistor 32. The complex audio voltage present at such point is represented schematically by the sine wave 94, the envelope of such sine wave being indicated at 95a and 95b. During the time period $T_0$-$T_1$, lamp 52 is illuminated (portion 91 of curve 90) to thereby effect supply of voltage from transducer 10 through the light-dependent resistor 19, amplifier 21, reverberator 11 and amplifier 31 to the indicated circuit point A.

It is emphasized that upon illumination of lamp 52 to reduce the resistance of light-dependent resistor 19, the voltage at point A increases very rapidly to commence generating the envelope portion 95a. Assuming that the signal emanating from transducer 10 is substantially continuous, the envelope portion 95a is horizontal and continuous as indicated. At time $T_1$, lamp 52 is turned off and lamp 55 is turned on. Accordingly, no signal from transducer 10 can reach reverberator 11, all signal at point A instead representing energy stored in the reverberator. Such signal declines exponentially as represented by the enevelope portion 95b, the first portion of the curve being very steep and the subsequent portions much more gradual. At time $T_2$, lamp 55 turns off and lamp 52 turns on to repeat the cycle (the cycle also repeating at time $T_4$ and subsequent corresponding times).

During the periods $T_1$-$T_2$, $T_3$-$T_4$, etc., when lamp 55 is illuminated to reduce the resistance of element 32 to a very low value, the signal at point A is fed into power amplifier 34 and then applied in amplified form to the speaker 13. It follows that an individual listening to speaker 13 hears sound representing the signal present during time portions $T_1$-$T_2$, $T_3$-$T_4$, etc. However, such person does not hear sound representing the time portions $T_0$-$T_1$, $T_2$-$T_3$, etc., because the light-dependent resistor 32 has a very high impedance value at such times.

In summary, therefore, speaker 13 generates sound during periods when reverberator 11 is unloading, but not during periods when such reverberator is being loaded. Such sounds decay exponentially as represented by envelope portions 95b. Furthermore, such sounds are reverberatory in nature.

It is pointed out that the signals generated by many common electrical musical instruments, such as guitars, etc., are relatively continuous and normally not staccato. Should it occur, however, that a staccato pulse or other corresponding signal terminates at a time substantially before time $T_1$, for example, the action of the reverberator 11 will be such as to cause the exponential decay to commence at a time substantially prior to time $T_1$. The result will be that the listener will hear only the lower-amplitude trailing or tail portion of the exponential curve (occurring between times $T_1$ and $T_2$).

The third curve in FIGURE 4, numbered 96, represents the voltage applied to input lamp 54 for the lower reverberator channel in FIGURE 1, that through reverberator 12. Such curve has portions 97 representing periods when no voltage is applied to lamp 54, and portions 98 representing periods when full voltage is applied thereto. Because of the above-described characteristics of switching control circuit 51, the portions 97 of no voltage applied to lamp 54 correspond to portions 91 when full voltage is applied to lamp 52. Thus, the curves 90 and 96 are 180 degrees out of phase, as are the voltage waves controlled thereby.

The fourth curve in FIGURE 4, numbered 99, represents the voltage present at point B in FIGURE 1, on the input side of the light-dependent resistor 41. The schematic sine wave representation of the audio signal is indicated at 100, and the enevolpe at portions 101a and 101b. Curve 99 corresponds to curve 93 except that it is 180 degrees out of phase relative thereto, and represents energy unloaded from the lower reverberator 12 instead of the upper reverberator 11. As is emphasized elsewhere in this specification, the characteristics of even "identical" reverberators are such that the audio waves unloaded from the reverberators will differ substantially from each other.

Referring next to FIGURE 5, five sets of signals are represented, respectively, at 102–106. Each of such sets 102–106 contains two curves, the upper curve representing the voltage at point C in FIGURES 1 and 2 (the output side of light-dependent resistor 32), and the lower curve representing the voltage at point D therein (the output side of light-dependent resistor 41). Thus, the curve sets 102–106 represent signals transmitted in amplified condition to the respective loudspeakers 13 and 14, and resulting from unloading of the respective reverberators 11 and 12.

The upper sets 102 and 103 represent the envelopes and also (schematically) the audio signals. Lower sets 104–106 represent only the envelopes, but it is emphasized that in all sets 102–106 a complex audio signal is actually present.

Because the voltage at point C is substantially the same as that at point A when lamp 55 is illuminated, and because the voltage at point D is substantially the same as that at point B when lamp 53 is illuminated, the curves in the various sets may be numbered correspondingly to the numbering between the times $T_0$-$T_1$, $T_2$-$T_3$, etc., in FIGURE 4. The upper curve in set 102, FIGURE 5, is therefore indicated as being a sine wave 94 the amplitude of which declines exponentially to form the envelope portion 95b, this being between time periods $T_1$-$T_2$, $T_3$-$T_4$, etc. Correspondingly, the lower curve in set 102, FIGURE 5, represents the sine wave 100 having an exponentially declining envelope portion 101b. The envelope portions 95a and 101a (FIGURE 4) do not appear in FIGURE 5, and do not reach the loudspeakers, because of the high impedances of resistors 32 and 41 during loading of the respective reverberators.

It will be observed that the time periods $T_1$-$T_2$, etc., in set 102, FIGURE 5, are somewhat longer than are the corresponding time periods in FIGURE 4. This results from a higher setting of variable resistor 74 in FIGURE 2 to slow the rate of oscillation of oscillator 57. The upper set 102 in FIGURE 5 represents an action in the nature of an echo, with each echo portion declining exponentially as indicated. As will be indicated below, the elapsed times between $T_1$-$T_2$, $T_2$-$T_3$, etc., in set 102 may be (for example) about two seconds.

Let it be assumed that a guitarist whose guitar incorporates transducer means 10 plays a chord at any time between times $T_1$ and $T_2$. When the chord is initially played it will not be heard except through the central or continuously-operating speaker 16 in FIGURE 1, assuming that such central speaker is in operation. Because the upper reverberator 11 is unloading during time period $T_1$-$T_2$, the transducer 10 will during such period feed into the lower reverberator 12. Accordingly, at time period $T_2$ the chord will (after storage) be fed to the lower speaker 14 as represented by envelope portion 101b in set 102. It is emphasized that the only signal transmitted to speaker 14 represents energy stored in the reverberator 12, there being no direct path from transducer 10 to speaker 14.

If the dwell of the chord is sufficient that it is still emanating from transducer 10 during time period $T_2$-$T_3$, such chord will pass into the upper reverberator 11 and will, at time $T_3$ and after storage, commence to unload therefrom as indicated by the upper right curve shown full-view in set 102. It follows that the chord will appear to bounce back and forth between the two speakers 13 and 14 arranged in stereophonic relationshp, the chord being reverberatory in nature and declining exponentially in amplitude.

Because only stored signals are transmitted to speakers 13 and 14 to effect sound generation thereby, the sound effects are extremely beautiful and striking. Even more striking effects occur when the guitarist plays a number of different chords in sequence, because one chord will be heard immediately through central speaker 16 while previously-played chords are head through echo speakers 13 and 14.

In the curves in upper set 102, times $T_1$–$T_2$ (etc.) are separated by, for example, about two seconds as indicated above. The second set 103 in FIGURE 5 represents a much faster setting of the oscillator 57, so that times $T_1$ and $T_2$, etc., are separated by (for example) about one second. The operation of the set 103 is substantially the same as that of set 102 except that the echo occurs at a much more rapid rate. It is pointed out that at time $T_2$, for example, the echo represented by the upper left curve envelope 95b cuts off relatively suddenly at region 107, this being because of the switching which occurred when lamp 55 becomes de-energized to drastically increase the resistance of resistor 32.

Referring next to set 104, there is represented a much faster setting of oscillator 57 to create an action more in the nature of a vibrato than an echo. The illustrated rate of vibrato action is on the general order of seven or eight per second. This takes both the upper and lower curves into consideration, so that each side may be repeated about three or four times per second.

The initial portion of each "pulse," in the upper curve of set 104, represents the rapidly-declining initial exponential portion 95b of the voltage wave present at point C (FIGURES 1 and 2). Such exponentially-declining portion merges with a curve portion 108 which represents the switching transient resulting when lamp 55 is de-energized. Correspondingly, the pulses in the lower curve in set 104 have initial portions representing envelopes 101b, and which merge with portions 109 illustrating the switching transients.

The vibrato action represented by set 104 is very pleasing to the ear, because of a number of factors. In the first place, each curve in the set 104 represents energy unloaded from a different one of reverberators 11 and 12, the ear first hearing sound representing signal from reverberator 11, then from reverberator 12, then from reverberator 11, etc. Despite the fact that the springs 25 (FIGURE 3) in such reverberators are preferably "identically" constructed, it is inherent in reverberator springs that various differences are present to cause each reverberator to generate its own peculiar or particular sound. The ear therefore senses distinctly different sounds from each of the two reverberators, and this creates a vibrato effect.

Another reason for the pleasing vibrato action is the rapid initial exponentially-decaying portion of each envelope. Yet another reason is because the various curve portions represent stored energy which was previously loaded into the respective reverberators. There is a major amount of overlapping, as well as other effects which produce novel and pleasing vibrato sensations.

Curve sets 105 and 106, FIGURE 5, also indicate vibrato actions but at much more rapid rates than that indicated by set 104. Thus, for example, the rate of vibrato action in set 105 may be on the order of about twelve per second (taking both sides into consideration), whereas that in set 106 may be on the order of about twenty-two per second. It is pointed out that in neither set 105 nor 106 is the sound completely discontinued in either channel, this being because the switching transient is sufficiently long that a new cycle commences in each channel prior to complete termination of the previous cycle therein. As the vibrato rate increases, the peakes of the curve portions are more closely approached by the valley (trough) portions thereof, the vibrato excursions being less pronounced.

The normal vibrato range is between about 3 cycles per second and about 22 cycles per second. This complete range and more, and also the desired range of echo frequencies, may be generated by the present apparatus.

As previously pointed out, the reverberators 11 and 12 preferably feed into separate and stereophonically related speakers 13 and 14, but in more inexpensive systems the number of speakers may be reduced. This is represented by the switches 33 and 42 (FIGURE 1) which may be shifted to feed all of the signal into the central speaker 16 (or into such speaker and one other). Also, as previously pointed out, the psychedelic lighting portions 83, 84, etc., are operative (particularly at the lower echo and vibrato frequencies) to create lighting effects which preferably correspond to the periods when sound is emanating from the associated speakers 13 and 14.

It is a feature of the present gated reverberation system that there is never a direct feedback loop from either speaker 13–14 through transducer 10 and thence back to such speakers. This is because at least one of the switches or gates in each channel 18 and 36 is open at all times. It follows that the present system minimizes the tendency toward generation of destructive feedback.

EMBODIMENT OF FIGURE 6

Relative to all embodiments of the invention, it is possible to employ different types of reverberators, different types of gating or switching devices, etc. For example, the light-dependent resistors and associated lamps may be replaced by field effect transistors, silicon controlled rectifiers, etc. Manual switching may also be utilized in some instances, as by means of a foot-operated switch or (for example) by a switching device associated with a plectrum held by a guitarist.

Figure 6:
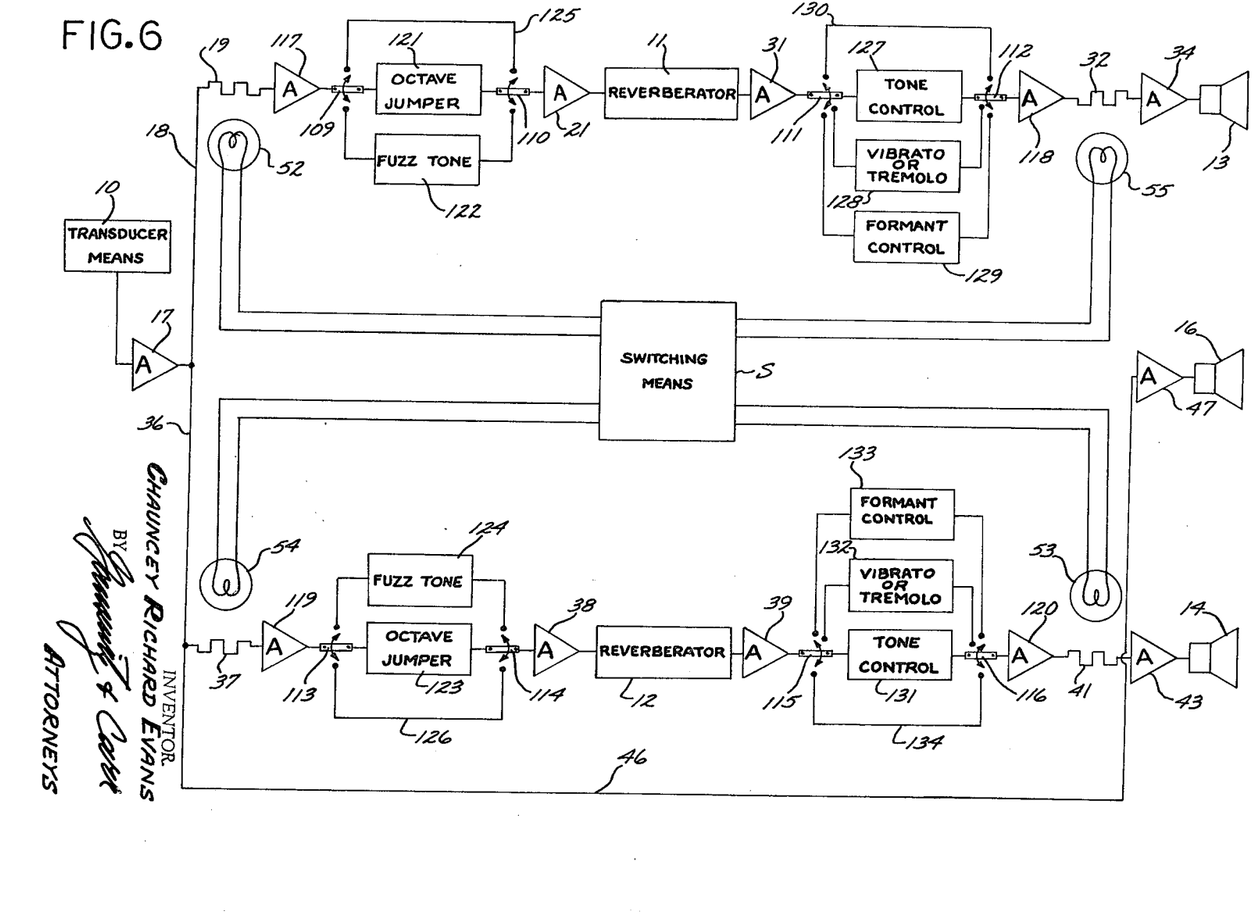
FIGURE 6 is a schematic diagram illustrating the incorporation of various types of additional elements in the basic circuit of FIGURE 1.

FIGURE 6 schematically represents at "S" a switching means which may be a player-initiated switching device or may be an electronic or other automatic switching device such as was described relative to circuit 51, for example. The switching means S effects alternate energization of lamp pairs 52–53 and 54–55 as set forth in detail above.

Except as will be stated, the circuit of FIGURE 6 is identical to that of FIGURE 1, being shown as incorporating elements having numbers corresponding to those in FIGURE 1. The psychedelic lighting means are not shown in FIGURE 6 but may be incorporated therein. Furthermore, the means for causing all outputs to feed to the central speaker 16 are not shown in FIGURE 6 but, again, may be incorporated if desired.

As previously described, the sound waves emanating from the opposite channels of the system are inherently different because of the different characteristics of the reverberators 11 and 12. The differences may be enhanced by utilizing certain control elements shown in FIGURE 6, or by utilizing other control elements known to the art. One such difference relates to the volume settings of power amplifiers 34 and 43, for example. Thus, if desired, one amplifier 34 may be so set that the sound from speaker 13 is more loud than that from speaker 14, thus creating an additional difference between the generated sound waves.

Each channel or side of the circuit of FIGURE 6 is illustrated as incorporating four series-related selector switches. Thus, the upper channel incorporates selector switches 109, 110, 111 and 112, whereas the lower channel incorporates the remaining four selector switches 113, 114, 115 and 116. Additional amplifier means may also be incorporated in each channel as necessary or desirable to create the requisite sound volume, such additional amplifiers being indicated at 117–120. Some of these (and other) amplifiers may be omitted at various times, in accordance with the characteristics of the particular circuit, the number of elements incorporated, etc.

The upper left selector switches 109 and 110 determine the introduction of an octave changing or "jumping" network 121 and also a tone blurring or "fuzzing" network 122 into the upper channel. Correspondingly, the lower left selector switches 113 and 114 control the introduction of an octave jumper 123 and fuzz tone 124 into the lower channel. All of such elements 121–124 may be omitted from the circuit when desired, by switching the selector switches into engagement with terminals at the ends of shunting leads 125 and 126.

It may be assumed, for example, that the upper octave jumper 121 is set to generate a tone one octave above that coming from the transducer 10, whereas the lower octave jumper 123 is set to generate a tone one octave below the transducer tone. Then the octave jumpers are in circuit, the listener hears the transducer tone through the central speaker 16, the upper-octave tone from speaker 13, and the lower-octave tone from speaker 14. This creates, particularly when the speakers are stereophonically related, a very novel effect. In like manner, one or both channels may be so set that the fuzz tone circuits 122 and 124 are employed. These are but several of the various elements which may be employed.

The upper right selector switches 111 and 112 determine the presence or absence in the circuit of a tone control 127, a vibrato or tremolo circuit 128, and a formant control 129. Also, a shunting lead 130 is provided in order to eliminate all elements 127–129 from the circuit when desired. Correspondingly, the lower right selector switches 115 and 116 permit switching into or out of the circuit of a tone control 131, a vibrato or tremolo circuit 132, a formant control 133 and a shunting lead 134.

Let it be assumed, for example, that the upper tone control 127 is set to make the high frequencies predominate, whereas the lower tone control 131 is set to make the low frequencies predominate. Then, when the associate selector switches are so set that the tone controls are in circuit, the sounds emanating from the speakers 13 and 14 are made more markedly different.

The vibrato or tremolo circuits 128 and 132 are particularly adapted to be employed when the circuit is set for echo operation (upper sets 102 and 103 in FIGURE 5). A vibrato or tremolo effect is then superimposed upon the decaying echo sounds.

The formant controls 129 and 133 are exemplary of additional control circuitry which may be associated with one or both sides of the system. It is also possible to incorporate lockout circuits, timing circuits, and various other devices in conjunction with the basic circuitry described herein.

Needless to say, a control element in the upper channel may be employed at a time different from that during which the corresponding control is utilized in the lower channel. Thus, for example, the octave jumper 121 may be employed simultaneously with fuzz tone 124. In addition, for example, the vibrato 128 may be employed at the same time as tone control 131. It is also possible, through unshown circuit means, to employ the vibrato and tone control elements 127–128 and 131–132 simultaneously if desired. The same applies to the other elements, such as the octave jumpers and fuzz tone circuits. The number of permutations and combinations is, therefore, extremely large and affords the operator a very wide selection of effects.

Throughout this specification and claims, the word "vibrato" has been employed where some may feel that the word "tremolo" would be more appropriate. It is to be noted, however, that in systems such as are represented by curves 104–106 in FIGURE 5 there are frequency variations as well as amplitude variations.

The present invention is, of course, not limited to musical systems, covering also public address systems, etc. The operation of the psychedelic lighting system is not limited to echo operation since it is also applicable (for example) to certain types of vibrato or tremolo actions.

The foregoing detailed description is to be clearly understood as given by way of illustration and example only, the spirit and scope of this invention being limited solely by the appended claims.

What is claimed is:

1. A storage system for connection between an audio signal source and a loudspeaker, which comprises:
    reverberatory storage means adapted to store audio energy,
    circuit means to connect said storage means in a circuit between an audio signal source and a loudspeaker,
    first switching means associated with said circuit means to open and close the same at a point between said signal source and said storage means,
    second switching means associated with said circuit means to open and close the same at a point between said storage means and said loudspeaker, and
    means to operate said first and second switching means in alternation relative to each other to cause said first switching means to be closed during at least part of the time when said second switching means is open, and said second switching means to be closed during at least part of the time when said first switching means is open.

2. The invention as claimed in claim 1, in which said means to operate said switching means causes said first switching means to be open at all times when said second switching means is closed, and said second switching means to be open at all times when said first switching means is closed.

3. The invention as claimed in claim 1, in which said storage means comprises an elongated spring having transducer means at each end portion thereof, said transducer means being incorporated in said circuit means.

4. The invention as claimed in claim 1, in which said means to operate said switching means is an automatic switch which causes said first switching means to be open and closed for time periods which are substantially equal to each other, and said second switching means to be open and closed for time periods which are substantially equal to each other and are also equal to said time periods of opening and closing of said first switching means.

5. The invention as claimed in claim 4, in which means are provided to vary the frequency of opening and closing of said first and second switching means by said automatic switch.

6. A reverberatory system adapted to be connected between an audio signal source and a loudspeaker means, which comprises:
    at least two reverberators adapted to store energy,
    first circuit means to connect the first of said reverberators in a circuit between an audio signal source and a loud-speaker means,
    second circuit means to connect the second of said reverberators in a circuit between said signal source and said loudspeaker means,
    first switching means associated with said first circuit means to effect loading of said first reverberator with signal from said signal source and thereafter effect unloading of stored signal from said first reverberator to said loudspeaker means,
    second switching means associated with said second circuit means to effect loading of said second reverberator with signal from said signal source and thereafter effect unloading of stored signal from said second reverberator to said loudspeaker means, and
    means to operate said first and second switching means in such manner that said reverberators unload at different times whereby a listener to said loudspeaker means is first aware of a sound representing signal unloaded from said first reverberator, and is then aware of sound representing signal unloaded from said second reverberator.

7. The invention as claimed in claim 6, in which each of said reverberators comprises an elongated spring having transducers at opposite ends thereof.

8. The invention as claimed in claim 6, in which said first and second reverberators are constructed substantially identically to each other.

9. The invention as claimed in claim 6, in which said means to operate said first and second switching means effects loading of said first reverberator while said second reverberator is unloading, and unloading of said first reverberator while said second reverberator is loading.

10. The invention as claimed in claim 9, in which said means to operate said first and second switching means causes said loading and unloading of said first reverberator to continue for time periods which are substantially equal to each other, and causes said loading and unloading of said second reverberator to continue for time periods which are substantially equal to each other.

11. The invention as claimed in claim 10, in which said means to operate said first and second switching means effects substantially continuous loading of alternate ones of said reverberators, and substantially continuous unloading of alternate ones of said reverberators, whereby the listener is continuously conscious of sound representing signal from one or the other of said reverberators, and whereby all signal from said audio source is transmitted to one or the other of said reverberators.

12. The invention as claimed in claim 11, in which said means to operate said first and second switching means is adapted to effect such operation thereof at a desired vibrato frequency.

13. The invention as claimed in claim 11, in which said means to operate said first and second switching means in adapted to effect such operation thereof at a desired echo frequency.

14. The invention as claimed in claim 6, in which said loudspeaker means comprises separate loudspeakers arranged in spaced relationship from each other in order to achieve a stereophonic effect, one of said separate loudspeakers being connected to said first circuit means, the other of said separate loudspeakers being connected to said second circuit means.

15. The invention as claimed in claim 14, in which an additional loudspeaker is connected to said audio signal source independently of said reverberators, said additional loudspeaker being located between said separate speakers fed by said first and second circuit means.

16. The invention as claimed in claim 6, in which an additional loudspeaker is connected to said audio signal source independently of said reverberators.

17. The invention as claimed in claim 6, in which said first switching means comprises a first switching element incorporated in said first circuit means between said audio source and said first reverberator, and a second switching element incorporated in said first circuit means between said first reverberator and said loudspeaker means, and in which said second switching means comprises a third switching element incorporated in said second circuit means between said audio source and said second reverberator, and a fourth switching element incorporated in said second circuit means between said second reverberator and said loudspeaker means.

18. The invention as claimed in claim 17, in which said means to operate said first and second switching means comprises electronic circuit means to cause said first and fourth switching elements to be closed at one set of alternate times, and to cause said second and third switching elements to be closed at another set of alternate times.

19. The invention as claimed in claim 17, in which said switching elements are light-dependent resistors.

20. The invention as claimed in claim 19, in which said means to operate said first and second switching means comprises a bistable multivibrator driven by a unijunction transistor relaxation oscillator, said multivibrator being connected to four lights which are optically coupled, respectively, with said light-dependent resistors.

21. A plural-channel reverberatory system for producing various sounds at different times, which comprises:
a first reverberator,
a second reverberator,
first circuit means to connect said first reverberator between an audio signal source and a loudspeaker means,
said audio signal source generating only a single audio signal,
second circuit means to connect said second reverberator between said audio signal source and said loudspeaker means, and
switching means to control said first and second circuit means in such manner that a listener to said loudspeaker means is at some times primarily conscious of sounds representing signal unloaded from said first reverberator, and at other times primarily conscious of sounds representing signal unloaded from said second reverberator,
said sounds inherently differing from each other because of factors including the inherent differences between said first and second reverberators.

22. The invention as claimed in claim 21, in which an additional signal-varying means is provided in at least one of said first and second circuit means to permit additional variation between the sounds emanating from said loudspeaker means.

23. The invention as claimed in claim 22, in which said additional signal varying means is an octave jumper.

24. The invention as claimed in claim 22, in which said additional signal varying means is a fuzz tone.

25. The invention as claimed in claim 22, in which said additional signal varying means is a tone control.

26. The invention as claimed in claim 22, in which said additional signal varying means is a formant control.

27. The invention as claimed in claim 22, in which said additional signal varying means is a vibrato or tremolo circuit.

28. A vibrato-generating circuit, which comprises:
first and second artificial reverberators,
circuit means to connect said reverberators in circuit between a source of only a single audio signal and a loudspeaker means, and
switching means associated with said circuit means to effect generation by said loudspeaker means of sound which corresponds to signal from said first reverberator and then of sound which corresponds to signal from said second reverberator,
said switching means and loudspeaker means effecting generation of said sounds in alternation, the rate of alternation being in the vibrato range whereby a listener to said loudspeaker means is conscious of a vibrato effect due to factors including inherent differences between said reverberators.

References Cited

UNITED STATES PATENTS

| | | |
|---|---|---|
| 2,879,683 | 3/1959 | Martin. |
| 3,048,072 | 8/1962 | Hanert. |
| 3,069,956 | 12/1962 | Bode. |
| 3,110,771 | 12/1963 | Logan et al. ______ 84—1.24 X |
| 3,156,769 | 11/1964 | Markowitz. |

KATHLEEN H. CLAFFY, Primary Examiner

W. A. HELVESTINE, Assistant Examiner